United States Patent
Motobayashi

(10) Patent No.: US 6,339,586 B1
(45) Date of Patent: Jan. 15, 2002

(54) INTERNET PROTOCOL SWITCH HAVING INPUT CELL BUFFERS

(75) Inventor: Ryota Motobayashi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/156,609

(22) Filed: Sep. 18, 1998

(30) Foreign Application Priority Data

Sep. 19, 1997 (JP) .............................................. 9-273801

(51) Int. Cl.[7] .......................... H04L 1/00; H04L 12/26; G01R 31/08; G06F 11/00; G08C 15/00
(52) U.S. Cl. ..................... 370/238; 370/230; 370/395.1; 370/412
(58) Field of Search ................................. 370/389, 395, 370/396, 397, 398, 399, 400, 401, 230, 231, 232, 235, 238, 412, 415, 419, 428; 709/238, 249

(56) References Cited

U.S. PATENT DOCUMENTS

| | | | | |
|---|---|---|---|---|
| 5,452,296 A | * | 9/1995 | Shimizu | 370/399 |
| 5,828,844 A | * | 10/1998 | Civanlar et al. | 709/228 |
| 5,996,021 A | * | 11/1999 | Civanlar et al. | 709/238 |
| 6,009,097 A | * | 12/1999 | Han | 370/395 |
| 6,049,546 A | * | 4/2000 | Ramakrishnan | 370/412 |
| 6,115,373 A | * | 9/2000 | Lea | 370/355 |

FOREIGN PATENT DOCUMENTS

| | | |
|---|---|---|
| JP | 2-206258 | 8/1990 |
| JP | 3-220947 | 9/1991 |
| JP | 5-260074 | 10/1993 |
| JP | 6-237481 | 8/1994 |

OTHER PUBLICATIONS

Japanese Office Action, dated Jun. 13, 2000, with English language translation of Japanese Examiner's comments.

Miki, K., Endo, N., Takase, A. & Abe, H., "IP Data Transfer over Public ATM Networks," *The Institute of Electronics, Information and Communication Engineers*, vol. 97, No. 210, pp. 13–18, Jul. 25, 1997.

Esaki, H., Matsuzawa, S., Mogi, A., Nagami, K., Jinmei, T. & Katsube, Y., "Cell Switch Router," *The Institute of Electronics, Information and Communication Engineers*, vol. 96, No. 215, pp. 43–48, Aug. 20, 1996.

* cited by examiner

*Primary Examiner*—Ajit Patel
*Assistant Examiner*—Bob A. Phunkulh
(74) *Attorney, Agent, or Firm*—McGuireWoods LLP

(57) ABSTRACT

In an internet protocol switch including a controller and a switch section controlled by the controller, the switch section includes an input cell buffer for receiving cells input to the switch section. The output of the input cell buffer is closed during a transition time from a selected flow connection linked to the input cell buffer and the controller, to a cut through connection linked to the input cell buffer without linking to the controller. Then, after the cut through connection is established, the output of the input cell buffer is opened.

2 Claims, 10 Drawing Sheets

INTERNET PROTOCOL SWITCH HAVING INPUT CELL BUFFERS

BACKGROUND OF THE INVENTION

1. Field of the Invention

The present invention relates to an internet protocol (IP) switch using an asynchronous transfer mode (ATM) switch in a switch section.

2. Description of the Related Art

A prior art IP switch is constructed by a controller and a switch section.

The operation of the prior art IP switch is as follows.

Initially, a connection from a first node via the IP switch to a second node is established by an initial path controlled under the controller. Then, after a predetermined time has passed, the initial path is replaced by a selected flow connection. In the selected flow connection, a logical IP connection from the first node via the switch section to the controller and a logical IP connection from the controller via the switch section to the second node are established.

Further, after another predetermined time has passed, the selected flow connection is replaced by a cut through connection, thus releasing the load of the controller. Note that the cut through connection is connected directly between the two nodes and without passing through the controller. This will be explained later in detail.

In the above-described prior art IP switch when the selected flow connection is replaced by the cut through connection, the connection between the two nodes may be disconnected for some time. As a result, if there are cells input to the IP switch during that time, such cells are discarded.

SUMMARY OF THE INVENTION

It is an object of the present invention to provide an IP switch capable of avoiding the scrapping of cells during a transition time from a selected flow connection to a cut through connection.

According to the present invention, in an IP switch including a controller and a switch section controlled by the controller, the switch section includes an input cell buffer for receiving cells input to the switch section. The output of the input cell buffer is closed during a transition time from a selected flow connection linked to the input cell buffer and the controller, to a cut through connection linked to the input cell buffer without linking to the controller. Then, after the cut through connection is established, the output of the input cell buffer is opened.

Since cells that reached the IP switch during the above-mentioned transition time are stored in the input cell buffer, such cells are never discarded. Therefore, it is unnecessary to retransmit cells between the nodes using an upper layer. As a result, the traffic efficiency can be enhanced.

BRIEF DESCRIPTION OF THE DRAWINGS

The present invention will be more clearly understood from the description as set below, as compared with the prior art, with reference to the accompanying drawings, wherein.

DESCRIPTION OF THE PREFERRED EMBODIMENT

Before the description of the preferred embodiment, a prior art IP switch will be explained with reference to FIGS. 1, 2A and 2B.

Figure 1:
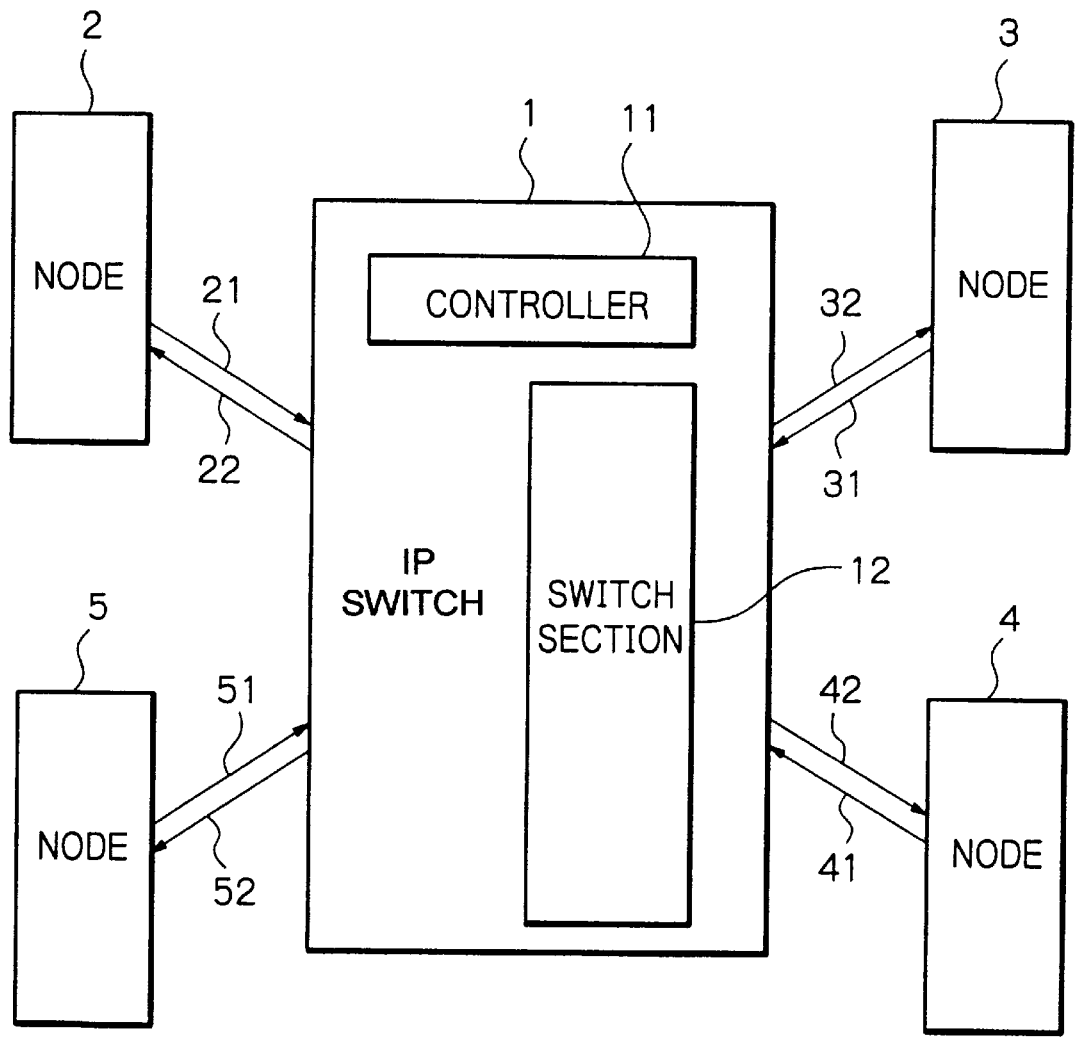
FIG. 1 is a block circuit diagram illustrating a prior art IP switch and its neighbor nodes.

In FIG. 1, which illustrates a prior art IP switch and its neighbor nodes, an IP switch 1 is connected to nodes 2, 3, 4 and 5. Note that each of the nodes 2, 3, 4 and 5 may be a unit for terminating a flow in accordance with "RFC 1953, Ipsilon Flow Management Protocol" and "RFC 1954, The Transmission of Flow Labelled $IP_{v4}$ on ATM Data Links". Also, each of the nodes 2, 3, 4 and 5 may be another IP switch or an IP switch gateway.

Also, the IP switch 1 is constructed by a controller 11 and a switch section 12.

Further, lines 21, 31, 41 and 51 are provided for transmission from the nodes 2, 3, 4 and 5, respectively, to the IP switch 1, and lines 22, 32, 42 and 52 are provided for transmission from the IP switch 1 to the nodes 2, 3, 4 and 5, respectively.

Communication between the IP switch 1 and the nodes 2, 3, 4 and 5 is carried out in accordance with "RFC 1953, Ipsilon Flow Management Protocol" and "RFC 1954, The Transmission of Flow Labelled $IP_{v4}$ on ATM Data Links".

The operation of the IP switch 1 of FIG. 1 is explained next with reference to FIGS. 2A and 2B. In FIGS. 2A and 2B, only traffic from the node 2 to the node 3 is considered.

Initially, a connection from the node 2 to the node 3 is established by an initial path (not shown) controlled under the controller 11. Then, after a predetermined time has passed, the initial path from the node 2 to the node 3 is replaced by a selected flow connection as shown in FIG. 2A.

Figure 2A:
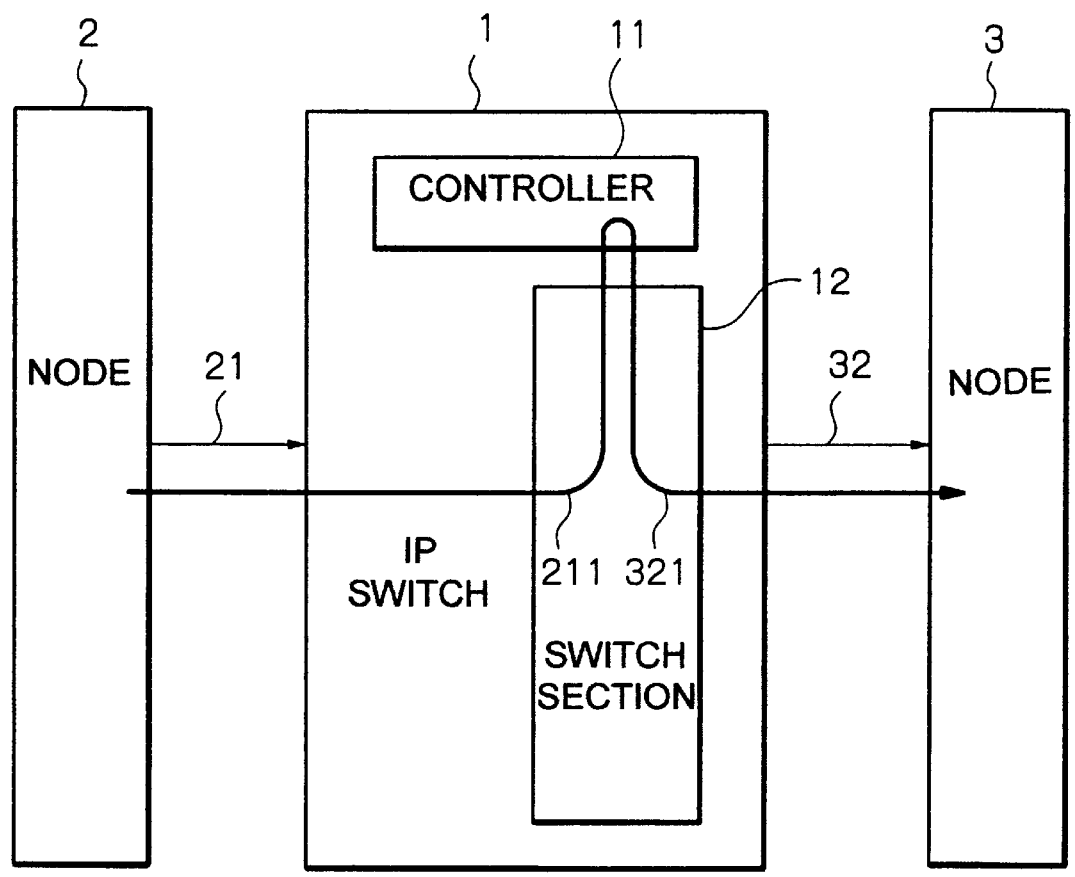
FIGS. 2A and 2B are diagrams for explaining the operation of the IP switch of FIG. 1.

In FIG. 2A, a logic connection 211 from the node 2 via the switch section 12 to the controller 11 and a logic connection 321 from the controller 11 via the switch section 12 to the node 3 are established.

Figure 2B:
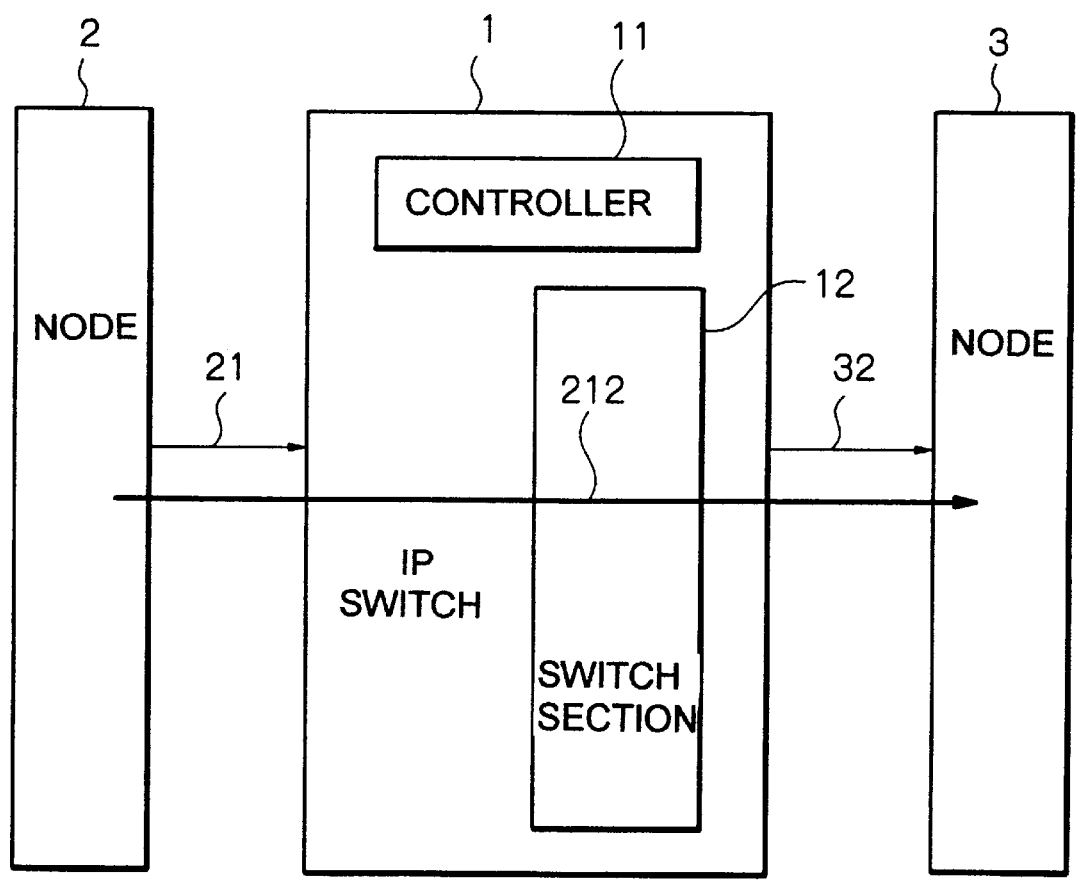

Further, after another predetermined time has passed, the selected flow connection as shown in FIG. 2A is replaced by a cut through connection as shown in FIG. 2B, thus releasing the load of the controller 11.

In FIG. 2B, a cut through connection 212 is connected directly between the nodes 2 and 3 without passing through the controller 11.

In the IP switch 1 of FIG. 1, however, when the selected flow connection (211, 321) is replaced by the cut through connection 212, the connection between the nodes 2 and 3 may be disconnected for some time. As a result, if there are cells input to the IP switch 1 during that time, such cells are discarded.

Figure 3:
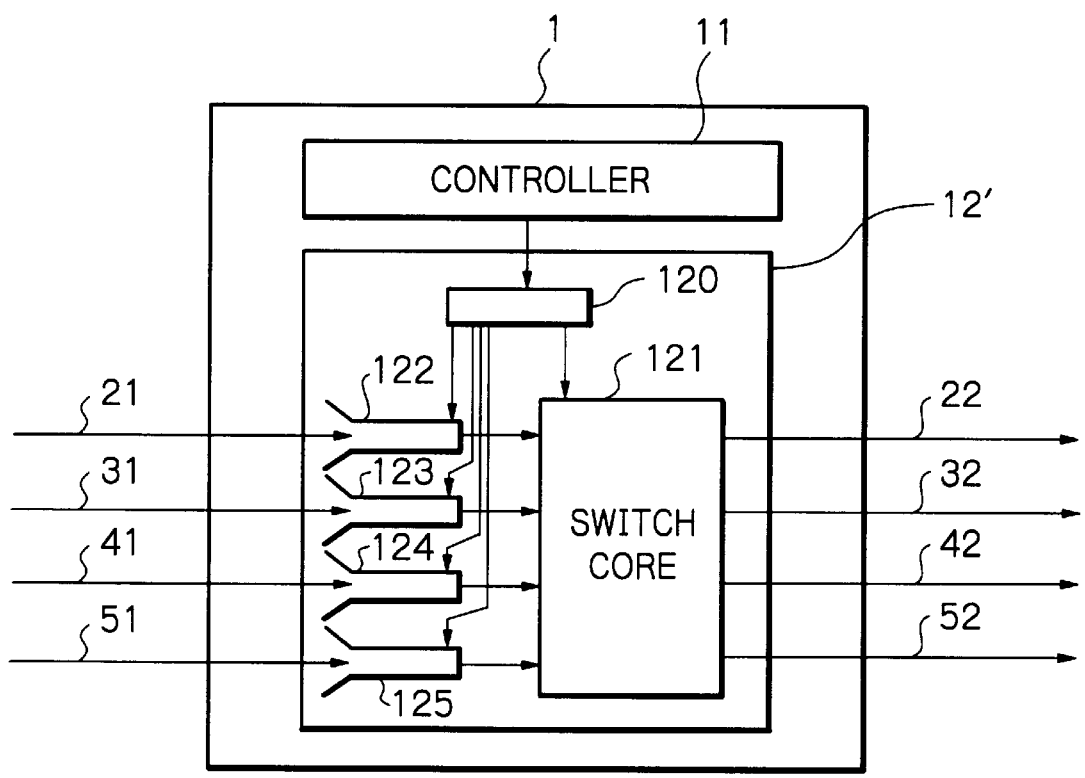
FIG. 3 is a block circuit diagram illustrating an embodiment of the IP switch according to the present invention.

In FIG. 3, which illustrates an embodiment of the IP switch according to the present invention, the switch section 12 of FIG. 1 is modified into a switch circuit 12' that includes a switch control circuit 120, a switch core 121 and input cell buffers 122 to 125.

Note that the controller 11 is constructed by a computer which includes a central processing unit (CPU), a read-only memory (ROM), random access memory (RAM) and the like. The switch core 121 is constructed by an ATM switch. Each of the input cell buffers 122 to 125 is constructed by a first-in first-out (FIFO) memory.

The operation of the IP switch 1 of FIG. 3 is explained next with reference to FIGS. 4A through 4F. In FIGS. 4 through 4F, only traffic from the node 2 to the node 3 is considered.

Initially, a connection from the node 2 to the node 3 is established by an initial path (not shown) controlled under the controller 11. Then, after a predetermined time has passed, the initial path from the node 2 to the node 3 is replaced by a selected flow connection as shown in FIG. 4A.

Figure 4A:
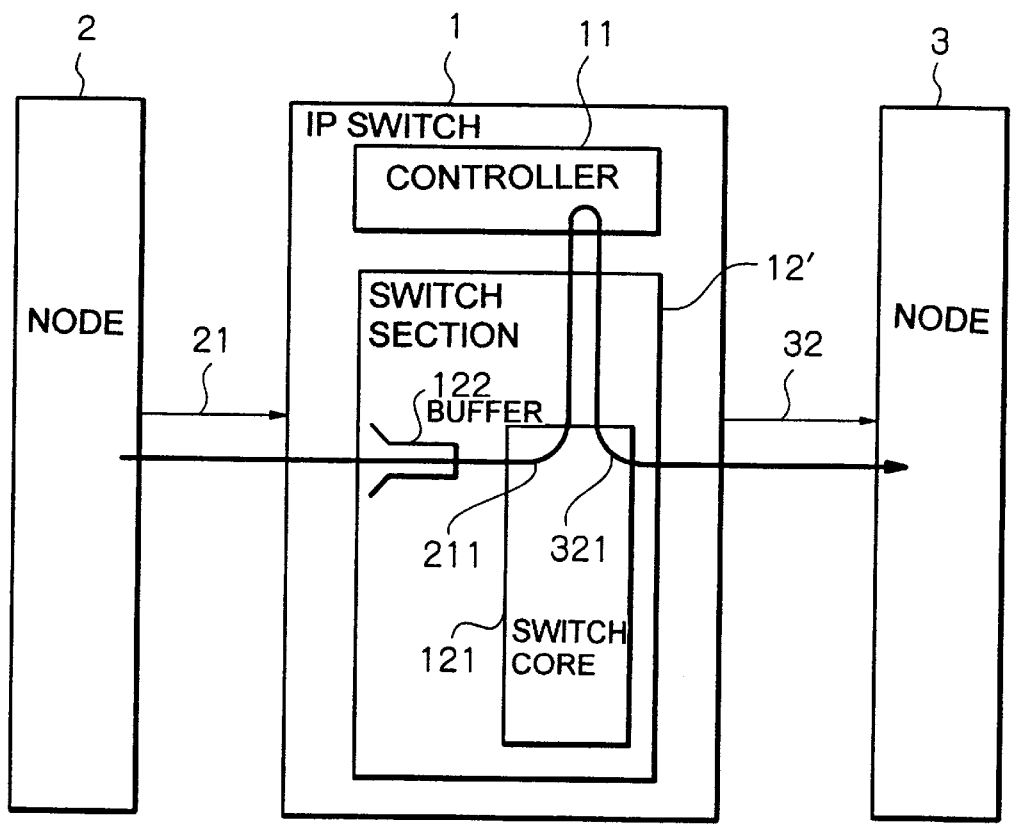
FIGS. 4A through 4F are diagrams for explaining the operation of the IP switch of FIG. 3.

In FIG. 4A, a logic connection 211 from the node 2 via the switch section 12' to the controller 11 and a logic connection 321 from the controller 11 via the switch section 12' to the node 3 are established.

Figure 4B:
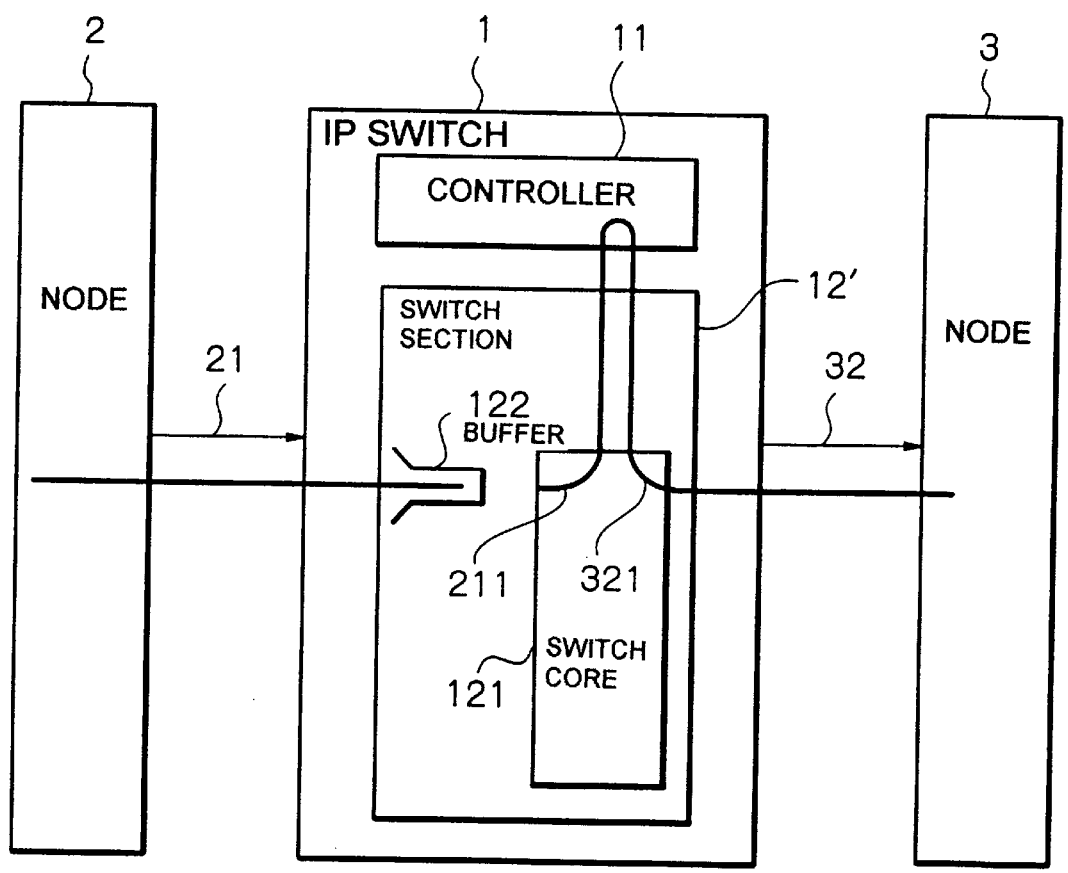

Further, after another predetermined time has passed, the selected flow connection as shown in FIG. 4A is disconnected as shown in FIG. 4B. That is, the controller 11 closes the output of the input cell buffer 122 by way of the switch control section 120 (see FIG. 3). As a result, all the cells having the node 2 as an origination and the node 3 as a destination are stored in the input cell buffer 122. Note that the closing of the output of the input cell buffer 122 is carried out simultaneously with the selection of the logic connection 211 which is also carried out by the controller 11 by way of the switch control section 120 (see FIG. 3) in accordance with an instruction based on "RFC 1987, Ipsilon General Switch Management Protocol". Hereinafter, note that the IP switch 1 of FIG. 3 will be operated in this protocol.

Figure 4C:
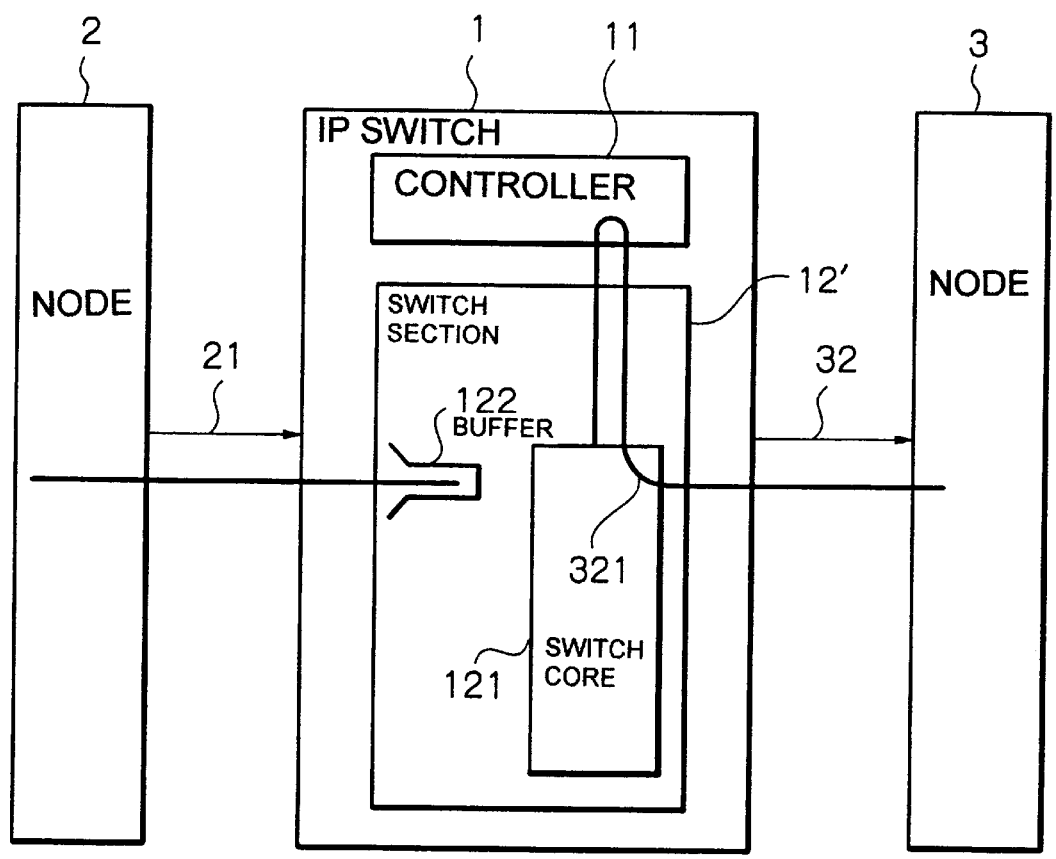

Next, as shown in FIG. 4C, the logic connection 211 within the switch core 121 is deleted by the controller 11 by way of the switch control section 120 (see FIG. 3).

Figure 4D:
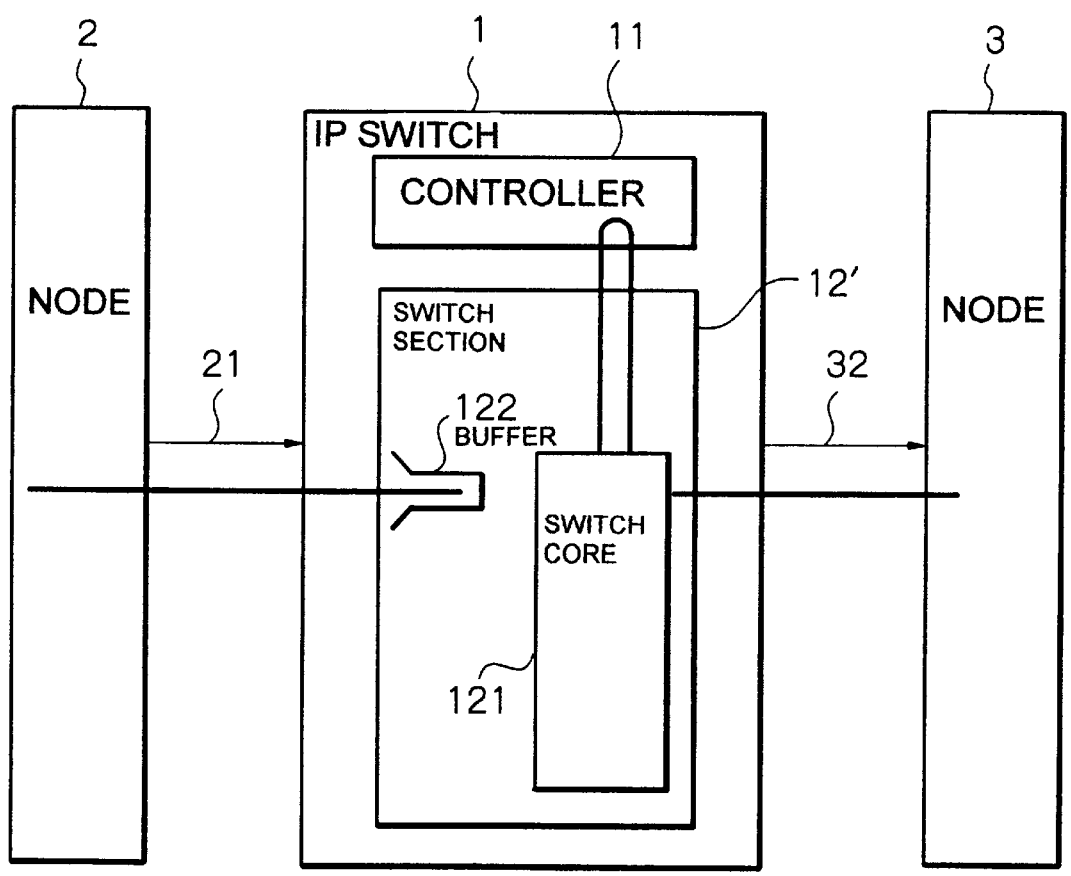

Next, as shown in FIG. 4D, the logic connection 321 within the switch core 121 is deleted by the controller 11 by way of the switch control section 120 (see FIG. 3).

Note that the operation as shown in FIG. 4D can be carried out in advance of the operation as shown in FIG. 4C.

Figure 4E:
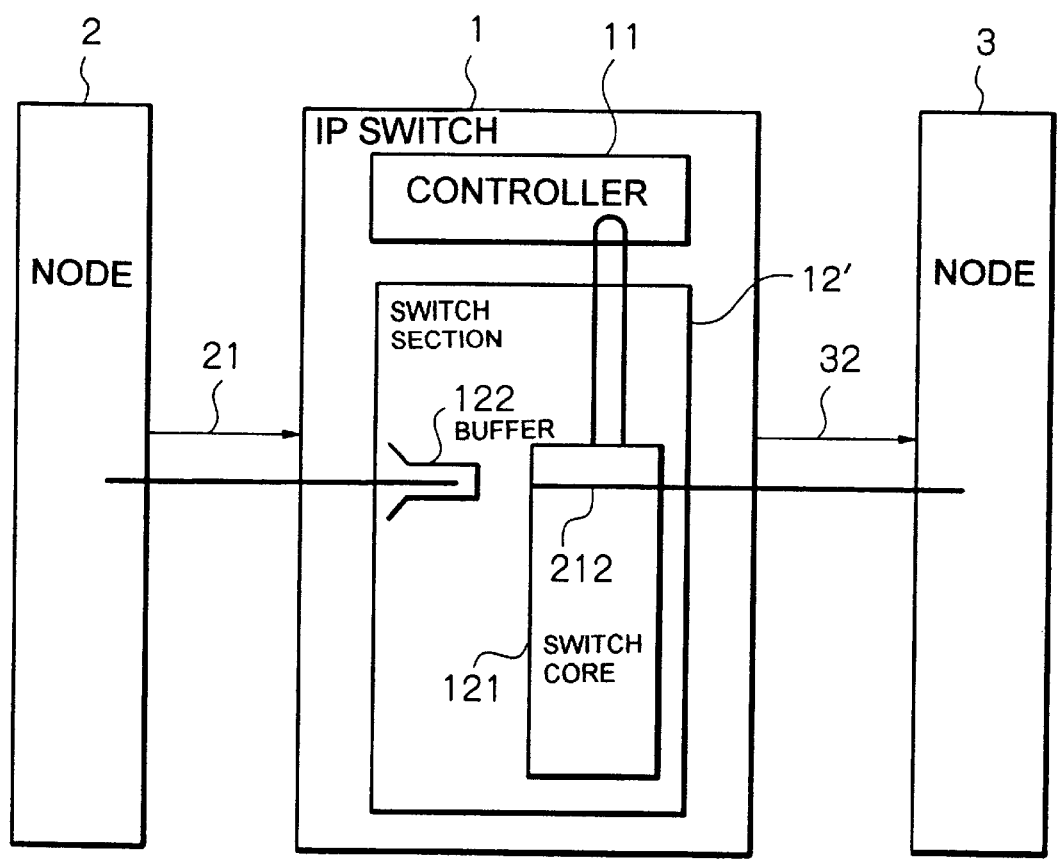
Figure 4F:
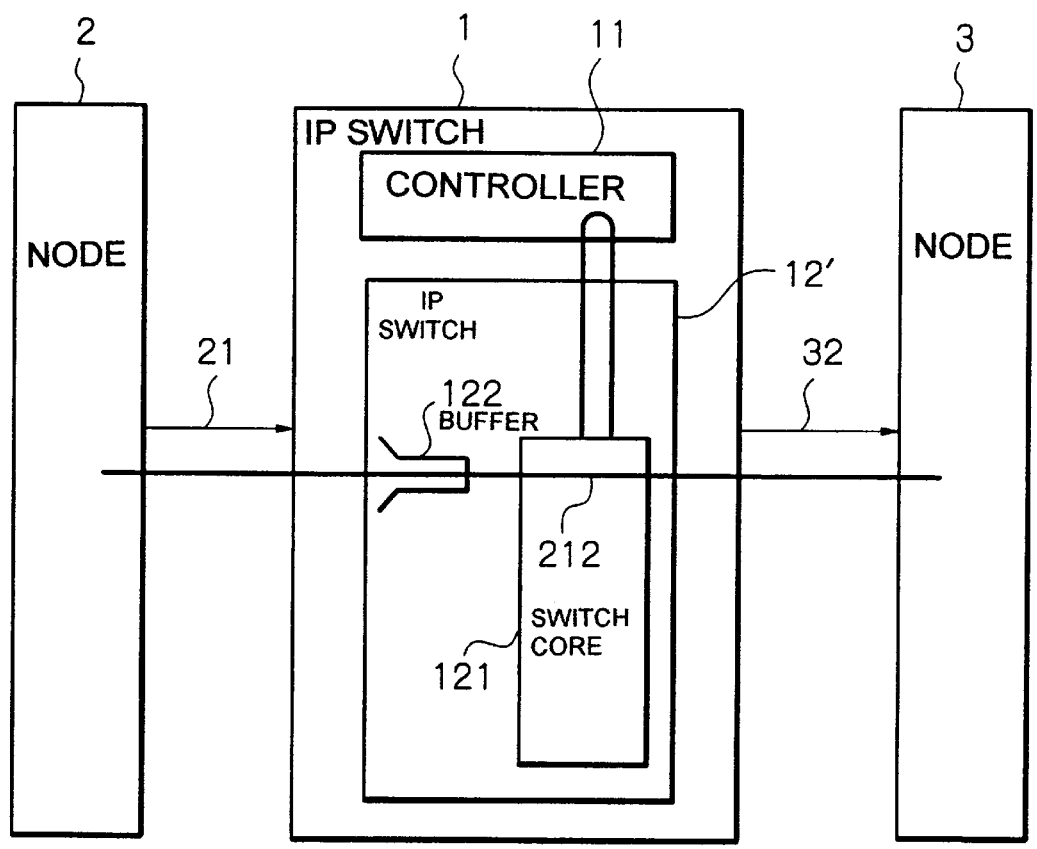

Next, as shown in FIG. 4E, a logic connection 212 is established by the controller 11 by way of the switch control section 120 (see FIG. 3).

Finally, as shown in FIG. 4F, the controller 11 opens the output of the input cell buffer 122 by way of the switch control section 120 (see FIG. 3). As a result, a cut through connection 212 from the node 2 to the node 3 is established. In this case, the cells stored in the input cell buffer 122 are supplied by the cut through connection 212 to the node 3, and thus, these cells are never discarded.

According to the present invention, the loss of cells during a transition time from a selected flow connection to a cut through connection can be avoided.

What is claimed is:

1. An internet protocol switch comprising:
    a controller; and
    a switch section including:
        a switch control section connected to said controller;
        a switch core connected to said switch control section; and
        an input cell buffer, connected to said switch core, for receiving cells and transmitting said cells to said switch core, said controller comprising:
            means for establishing a selected flow connection linked from said input cell buffer via said switch core and said controller to said switch core;
            means for closing an output of said input cell buffer when said selected flow connection is required to be replaced by a cut through connection;
            means for deleting a first part of said selected flow connection within said switch core on a side of said input cell buffer, after the output of said input cell buffer is closed;
            means for deleting a second part of said selected flow connection within said switch core on an opposite side of said input cell buffer, after the first part of said selected flow connection is deleted;
            means for establishing said cut through connection within said switch core, after the second part of said selected flow connection; and
            means for opening the output of said input cell buffer, after said cut through connection is established.

2. An internet protocol switch comprising:
    a controller; and
    a switch section including:
        a switch control section connected to said controller;
        a switch core connected to said switch control section; and
        an input cell buffer, connected to said switch core, for receiving cells and transmitting said cells to said switch core, said controller comprising:
            means for establishing a selected flow connection linked from said input cell buffer via said switch core and said controller to said switch core;
            means for closing an output of said input cell buffer when said selected flow connection is required to be replaced by a cut through connection;
            means for deleting a first part of said selected flow connection within said switch core on an opposite side of said input cell buffer, after the output of said input cell buffer is closed;
            means for deleting a second part of said selected flow connection within said switch core on a side of said input cell buffer, after the first part of said selected flow connection is deleted;
            means for establishing said cut through connection within said switch core, after the second part of said selected flow connection; and
            means for opening the output of said input cell buffer, after said cut through connection is established.

* * * * *